United States Patent
Tanizawa et al.

(10) Patent No.: US 9,928,370 B2
(45) Date of Patent: Mar. 27, 2018

(54) COMMUNICATION DEVICE, COMMUNICATION METHOD, COMPUTER PROGRAM PRODUCT, AND COMMUNICATION SYSTEM

(71) Applicant: Kabushiki Kaisha Toshiba, Minato-ku (JP)

(72) Inventors: Yoshimichi Tanizawa, Yokohama (JP); Hideaki Sato, Yokohama (JP); Ririka Takahashi, Setagaya-ku (JP); Shinichi Kawamura, Kodaira (JP); Shinya Murai, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 41 days.

(21) Appl. No.: 14/184,907

(22) Filed: Feb. 20, 2014

(65) Prior Publication Data

US 2014/0365786 A1    Dec. 11, 2014

(30) Foreign Application Priority Data

Jun. 11, 2013 (JP) .................................. 2013-122409

(51) Int. Cl.
*G06F 21/00* (2013.01)
*G06F 21/60* (2013.01)
(Continued)

(52) U.S. Cl.
CPC .......... *G06F 21/602* (2013.01); *G06F 21/629* (2013.01); *H04L 9/0816* (2013.01); *H04L 9/0855* (2013.01); *H04L 63/061* (2013.01)

(58) Field of Classification Search
None
See application file for complete search history.

(56) References Cited

U.S. PATENT DOCUMENTS 6,182,216 B1 * 1/2001 Luyster ................... H04L 9/002
380/28
7,093,139 B2 * 8/2006 Silverbrook ............ G06F 21/31
380/264
(Continued)

FOREIGN PATENT DOCUMENTS

JP    63-131169 A    6/1988
JP    2008-154019    7/2008
(Continued)

OTHER PUBLICATIONS

Liu Donggang; Dong Qi. Detecting Misused Keys in Wireless Sensor Networks. IEEE International Performance, Computing, and Communications Conference. IPCCC 2007. Pub. Date: 2007. http://ieeexplore.ieee.org/stamp/stamp.jsp?arnumber=4197940.*
(Continued)

*Primary Examiner* — Jeremiah Avery
(74) *Attorney, Agent, or Firm* — Oblon, McClelland, Maier & Neustadt, L.L.P.

(57) ABSTRACT

According to an embodiment, a communication device includes an acquirer and a determiner. The acquirer is configured to acquire a first history value for each of one or more applications that use an encryption key. The first history value indicates a history value of a volume of the encryption key used by the each of one or more applications. The determiner is configured to determine a volume of the encryption key to be assigned to the corresponding application, according to the first history value.

9 Claims, 4 Drawing Sheets

(51) Int. Cl.
   *G06F 21/62* (2013.01)
   *H04L 9/08* (2006.01)
   *H04L 29/06* (2006.01)

(56) References Cited

U.S. PATENT DOCUMENTS

| | | | | |
|---|---|---|---|---|
| 7,181,017 | B1* | 2/2007 | Nagel | H04L 9/0825 380/282 |
| 7,392,378 | B1 | 6/2008 | Elliott | |
| 7,457,416 | B1* | 11/2008 | Elliott | H04L 9/0852 380/256 |
| 7,646,873 | B2 | 1/2010 | Lee et al. | |
| 7,757,086 | B2* | 7/2010 | Walmsley | B41J 2/17546 380/259 |
| 7,881,472 | B2* | 2/2011 | Matsumoto | H03M 13/1102 380/260 |
| 8,051,287 | B2* | 11/2011 | Shetty | H04L 9/3242 380/255 |
| 8,677,505 | B2* | 3/2014 | Redlich | G06F 21/577 713/166 |
| 8,855,316 | B2* | 10/2014 | Wiseman | H04L 9/0852 380/277 |
| 2003/0095659 | A1* | 5/2003 | Ishihara | H04L 9/001 380/46 |
| 2005/0251491 | A1* | 11/2005 | Medina | G06Q 20/3829 705/71 |
| 2006/0005048 | A1* | 1/2006 | Osaki | G06F 11/1464 713/193 |
| 2006/0136725 | A1* | 6/2006 | Walmsley | H04L 9/12 713/171 |
| 2007/0016769 | A1* | 1/2007 | Gentry | H04H 60/23 713/163 |
| 2007/0113078 | A1* | 5/2007 | Witt | G06F 21/602 713/165 |
| 2007/0174916 | A1* | 7/2007 | Ching | G06F 21/602 726/24 |
| 2007/0180239 | A1* | 8/2007 | Fujibayashi | G06F 11/1076 713/165 |
| 2007/0189515 | A1* | 8/2007 | Ajtai | H04L 9/3093 380/30 |
| 2008/0098226 | A1* | 4/2008 | Zokumasui | H04L 9/0891 713/171 |
| 2008/0263363 | A1* | 10/2008 | Jueneman | G06F 21/32 713/184 |
| 2009/0172417 | A1* | 7/2009 | Mikami | G06F 11/1471 713/193 |
| 2009/0290707 | A1* | 11/2009 | Schneider | G06F 21/6209 380/45 |
| 2010/0211787 | A1* | 8/2010 | Bukshpun | H04L 9/0838 713/170 |
| 2011/0264924 | A1* | 10/2011 | Koifman | G06F 3/0623 713/189 |
| 2011/0314279 | A1* | 12/2011 | Ureche | H04L 9/3228 713/167 |
| 2012/0039473 | A1* | 2/2012 | Gentry | H04L 9/008 380/277 |
| 2012/0079281 | A1* | 3/2012 | Lowenstein | G06F 21/602 713/189 |
| 2013/0138961 | A1 | 5/2013 | Tsuji et al. | |
| 2014/0023192 | A1 | 1/2014 | Tanizawa et al. | |

FOREIGN PATENT DOCUMENTS

| | | |
|---|---|---|
| JP | 2011-44768 A | 3/2011 |
| JP | 2014-22898 A | 2/2014 |
| WO | WO 2012-025987 A1 | 3/2012 |

OTHER PUBLICATIONS

Chu, Jonathan M.; Montanari, Mirko; Campbell, Roy H. A Case for Validating Remote Application Integrity for Data Processing Systems. 2012 5th International Symposium on Resilient Control Systems (ISRCS). Pub. Date: 2012. http://ieeexplore.ieee.org/stamp/stamp.jsp?arnumber=6309313.*

O Maurhart "QKD Networks Based on Q3P", Chapter 8, Lect. Notes Phys. 797, 2010, 21 pages.

Mehrdad Dianati et al. "Architecture and protocols of the future European quantum key distribution network", Security and Communication Networks, 2008, 18 pages.

U.S. Appl. No. 14/189,032, filed Feb. 25, 2014, Tanizawa, et al.

* cited by examiner

COMMUNICATION DEVICE, COMMUNICATION METHOD, COMPUTER PROGRAM PRODUCT, AND COMMUNICATION SYSTEM

CROSS-REFERENCE TO RELATED APPLICATION

This application is based upon and claims the benefit of priority from Japanese Patent Application No. 2013-122409, filed on Jun. 11, 2013; the entire contents of which are incorporated herein by reference.

FIELD

Embodiments described herein relate generally to a communication device, a communication method, a computer program product, and a communication system.

BACKGROUND

There are two networks (a key sharing network, an application network) for a key generation/sharing system. The key sharing network is configured from a plurality of nodes that are interconnected by a plurality of links into a network. Each node includes a function of generating and sharing a random number with a correspondent node connected by a link, and a function of performing encrypted communication over the link by using the random number that is generated and shared as an encryption key (hereinafter, a link key). Also, some of the nodes include a function of generating an encryption key (hereinafter, an application key) which is a random number independently of the link, and a function of transmitting the application key to another node over a link.

An application includes a function of acquiring an application key from a node, and performing encrypted data communication with another application by using the acquired application key as an encryption key. The encrypted data communication here may be realized by a network (an application network) different from the key sharing network, such as the Internet. Also, the node and the application may be realized in an integrated manner. The node and the application may also be configured as independent terminals, and the application key may be transmitted/received between the two.

The function of the node of generating and sharing a random number (a link key) with a correspondent node connected by a link may also be realized by a technique generally called quantum cryptography or quantum key distribution (QKD), for example.

In the key generation/sharing system, one of the most important resources is the key. Accordingly, with a node connected with a plurality of applications, the method of assigning an application key to each application (a key assignment method) is important from the standpoint of system efficiency. However, with conventional techniques, there are cases where application keys are not efficiently assigned.

DETAILED DESCRIPTION

Figure 1:
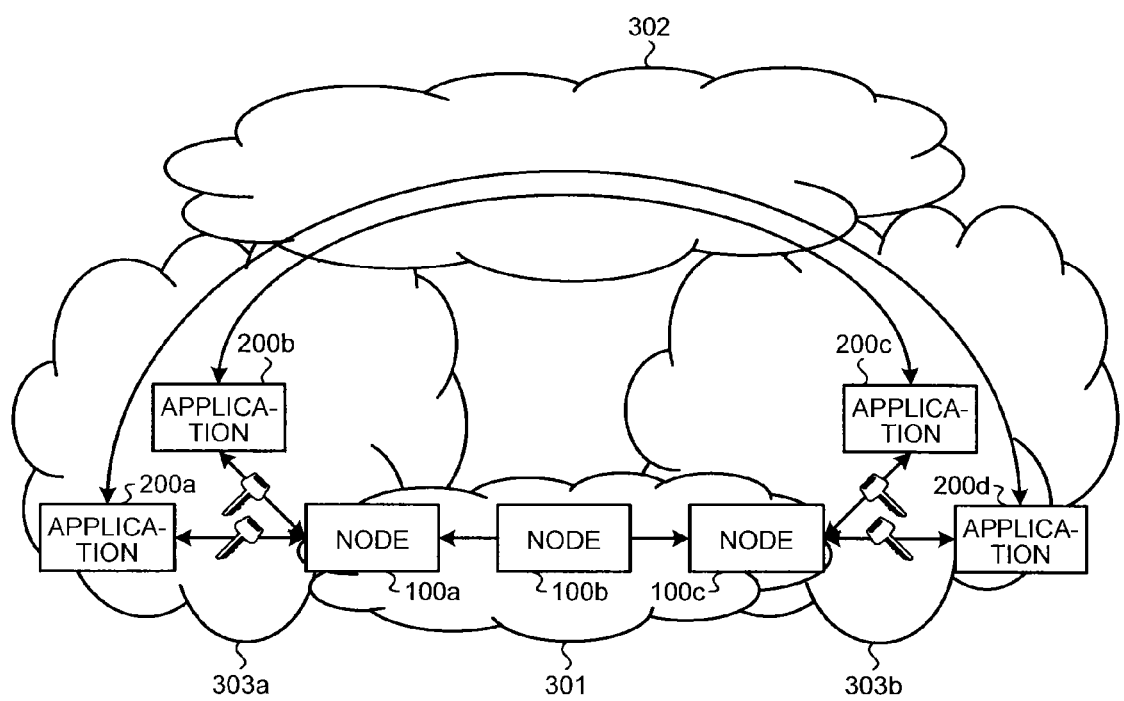
FIG. 1 is a network configuration diagram of a communication system according to an embodiment.

According to an embodiment, a communication device includes an acquirer and a determiner. The acquirer is configured to acquire a first history value for each of one or more applications that use an encryption key. The first history value indicates a history value of a volume of the encryption key used by the each of one or more applications. The determiner is configured to determine a volume of the encryption key to be assigned to the corresponding application, according to the first history value.

Hereinafter, a preferred embodiment of a communication device according to the present invention will be described in detail with reference to the appended drawings.

Although not a method of assigning an application key to an application, as the method of assigning a link key, the following methods are known.

M1: A method of assigning a link key to a transmission key buffer and a reception key buffer In this method, assignment to a buffer with a currently small amount of accumulation is prioritized.

M2: A method of assigning a link key to an application

In this method, a key rate is set in a node for each application in advance, and a link key is assigned to an application based on the key rate.

Now, as a method, of the key generation/sharing system as described above, of assigning an application key to an application, the method such as M1 is not necessarily the best. In the case where an application and a node are separately configured, a storage unit for accumulating a key is provided to each of the application and the node. Also, the timing of the application acquiring a key from the node, and the timing of the application actually using the key and performing encrypted communication are different. Moreover, the timings are also different depending on the type and a realization method of the application. Accordingly, for example, even if a method of assigning a key by focusing only on the accumulation amount of keys and the reduction amount is adopted at a node as the method of assigning an application key to an application, the key assignment is possibly inefficient, not reflecting the actual key usage history of the application.

A communication device according to the present embodiment determines the volume of the application key to be assigned to an application, based on the actual usage history of the application key at the application. The application key may thereby be assigned efficiently while taking the actual key usage history into account.

As described, the present embodiment relates to a method of a node for assigning an application key to an application (a method of a node for securing in advance a certain application key for a specific application so that the application may be used in a dedicated manner). The key assignment method of the present embodiment includes processes as follows.

(1) A node acquires "history information" about the amount of data communication (for example, in bytes) of each application from a communication interface (IF) or the like of the application.

(2) At the time receiving a communication start request from the application, the node stores information about "encryption method" used by the application in the encrypted data communication. The communication start request serves also as a trigger to start assignment of an application key. The ratio of the amount of data communication and the required volume of key (for example, in bytes) may be determined based on the encryption method, for example.

The node acquires a history value of the amount of data communication of the application by the process of (1). Then, the node may calculate the volume of the key (key usage history) that the application has actually used, based on the ratio of the amount of data communication and the required volume of key, which is the information stored by the process of (2). The node of the present embodiment determines the volume of the application key to be assigned to each application by using the information of the "key usage history" which has been calculated.

FIG. 1 is a diagram illustrating an example network configuration of a communication system according to the present embodiment. The communication system includes a key sharing network 301, an application network 302, and private networks 303a and 303b. Also, the communication system includes nodes 100a to 100c and applications 200a to 200d as communication devices.

In the case where there is no need to distinguish between the nodes 100a to 100c, they may simply be referred to as the node(s) 100. In the case where there is no need to distinguish between the applications 200a to 200d, they may simply be referred to as the application(s) 200. The number of nodes 100 is not limited to three. Also, the number of applications 200 is not limited to four. FIG. 1 illustrates an example where the node 100 and the application 200 are independently realized.

The private networks 303a and 303b are each a network for connecting a node 100 and an application 200 to which an application key is to be provided by the node 100.

As described above, the nodes 100a to 100c each have a function of generating and sharing a random number with a correspondent node, and a function of performing encrypted communication over a link by using the generated random number as a link key.

The node 100 may also include a function of generating a random number independently of the link, and a function of transmitting the generated random number to another node.

Figure 2:
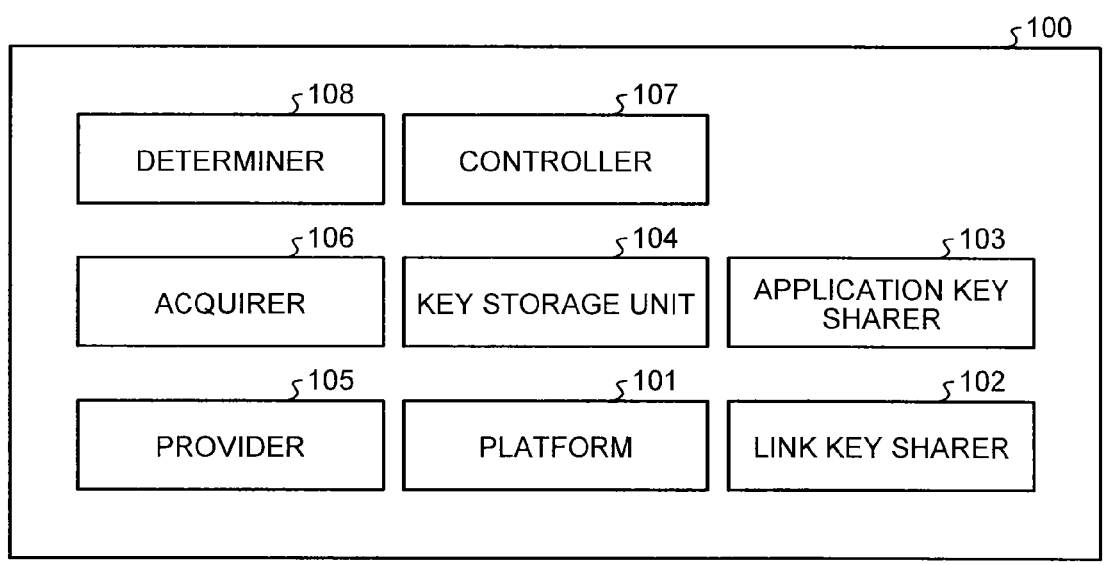
FIG. 2 is a block diagram of a node according to the embodiment.

FIG. 2 is a block diagram illustrating an example configuration of the node 100 according to the present embodiment. The node 100 includes a platform 101, a link key sharer 102, an application key sharer 103, a key storage unit 104, a provider 105, an acquirer 106, a controller 107, and a determiner 108.

The platform 101 realizes basic process management function, network function, security function, data accumulation function and the like, as an operating system of a computer realizing the node 100.

The link key sharer 102 shares a link key with another node 100 that is directly connected, by using a quantum key distribution technique or the like. The application key sharer 103 exchanges and shares an application key with another node 100 (a node which is directly connected or a node which is not directly connected). The application key sharer 103 also performs control necessary for exchanging the application key.

The key storage unit 104 stores the link key and the application key. The provider 105 is a communication interface to the application 200. The provider 105 processes a communication start request from the application 200, or the like, for example, and provides an application key in response to an application key request.

The acquirer 106 acquires, for each application 200 that uses an application key as an encryption key, the "key usage history" (a first history value), which is the history value of the volume of application key used by the application 200. For example, the acquirer 106 first acquires, from the application 200, information necessary to calculate the "key usage history" of the application 200 (for example, the "history information" mentioned above (a second history value)), and the like. Also, the acquirer 106 acquires, from the application 200, information indicating the encryption method, for example. The acquirer 106 may acquire (calculate) the "key usage history" by using the second history value and the ratio of the amount of communication and the required volume of key. As described above, the ratio of the amount of communication and the required volume of key may be determined from the encryption method. The information indicating the encryption method may be acquired from the application 200 at the time of communication start request, for example.

The determiner 108 determines the assignment method (policy) of the application key for each application 200 according to the history value of the application key used by each application 200. The determiner 108 determines an assignment method with respect to the proportion, amount, timing, algorithm, and the like of the application key to be assigned to the applications 200. In the present embodiment, the determiner 108 determines the assignment method with the information acquired by the acquirer 106 as input information.

The controller 107 controls the entire node 100. The controller 107 performs the process of actually assigning the application key shared by the application key sharer 103 to each node 100 according to the assignment method determined by the determiner 108, for example.

Additionally, the platform 101, the link key sharer 102, the application key sharer 103, the provider 105, the acquirer 106, the controller 107, and the determiner 108 may be realized by causing a processing device such as a CPU (Central Processing Unit) to execute programs, that is, by software, or by hardware such as an IC (Integrated Circuit) or the like, or by a combination of software and hardware, for example.

Also, the key storage unit 104 may be configured by any storage medium that is generally used, such as a HDD (Hard Disk Drive), an optical disk, a memory card, a RAM (Random Access Memory), or the like, for example.

Next, details of the "history information", the "encryption method" and the "key usage history" will be given.

The "history information" is information that may be acquired as statistical information from a communication IF or the like of a device (a computer or the like) executing the application 200. For example, it is a value indicating information of how many bytes has been transmitted/received. The "history information" may also be acquired by the node 100 making an inquiry to the application 200 or to the device executing the application 200. Alternatively, the application 200 may be configured to periodically transmit the statistical information to the node 100.

Furthermore, in the latter case, various patterns are conceivable also with respect to the frequency of how often notifications regarding the statistical information are issued. For examples, variations include issuance of notification every time communication of 500 bytes is performed, issuance of notification every time communication of 500 kbytes is performed, issuance of notification regarding statistical information about the current amount of data communication every one minute, and the like. As one example of realization method of the application 200 for acquiring such statistical information, there is a method of using MIB (Management Information Base) information of the communication IF and performing acquisition by SNMP (Simple Network Management Protocol).

The "encryption method" refers to the encryption method that is used at the time of a pair of applications 200 performing encrypted data communication over the application network 302 using the application key acquired from the node 100. At the time of acquiring an application key and starting encrypted data communication, an application 200 issues a communication start request to the node 100. The node 100 which has received the communication start request performs a key sharing process for sharing an application key with another application 200 which is specified as a communication counterpart by the application 200, and performs key assignment to the applications 200.

The communication start request may include information about what type of encryption method is used by the application 200 (information indicating the encryption method). The acquirer 106 of the node 100 may acquire information about the encryption method of the application 200 by storing the information included in the communication start request. The node 100 may grasp the "ratio of the amount of data communication and the required volume of key" of the encryption method from the information indicating the encryption method.

There are various types of encryption methods. For example, OTP (One Time Pad) is an encryption method according to which the "ratio of the amount of data communication and the required volume of key" is 1:1. With other general encryption methods such as AES and DES, the amount of data communication is greater than the volume of key. Depending on the encryption method, the "ratio of the amount of data communication and the required volume of key" is not a fixed ratio. AES, which is a versatile encryption method, falls into this category. In such a case, in addition to that, for example, AES is used as the encryption method, information on re-key about after transmission/reception of what amount of data the AES key is updated may be expressed as the "encryption method". In this manner, even in a case where an encryption method such as AES is used, the node 100 is enabled to grasp the "ratio of the amount of data communication and the required volume of key" of the encryption method.

Additionally, as described above, the node 100 grasps the "encryption method" at the time of processing a communication start request, but the method of grasping is not limited to the above. For example, a method of notifying the node 100, by the application 200, of the "encryption method" that is currently used, in the same manner as for the "history information", may be adopted.

The "key usage history" is the volume of application key used by the application 200 actually performing encrypted data communication. As described above, the node 100 may calculate the "key usage history" from the "history information" and the "encryption method" which have been acquired. In the present embodiment, key assignment is performed by using the information of the "key usage history".

Additionally, depending on the realization method or the like of the application 200, there may be cases where the node 100 is enabled to acquire the information of the "key usage history" directly from the application 200. In such a case, the node 100 does not have to acquire the "history information" from the application 200 or to grasp the "encryption method".

As an encryption method capable of adopting this method, AES according to which the key is updated (re-keyed) at predetermined intervals may be cited. The application 200 is configured to notify the node 100 of a rekey completion event every time rekey is completed. It is assumed that the node 100 knows the length of the AES key of the application 200 (a configuration is possible where key length information is included in a rekey notification). In this case, the node 100 may calculate the volume (size) of the application key used by the application 200, that is, the "key usage history" from the information of the timings, the number of times, or the like, of rekeys and the information of the key length used by the encryption method. In this manner, according to some encryption methods, with the configuration where a notification regarding rekey is issued, the node 100 is enabled to directly acquire the "key usage history" without acquiring, or through, the "history information" of the application 200.

In the following, variations of key assignment methods that use the "key usage history" of the present embodiment will be described. As the key assignment methods, (Method A), (Method B) and (Method C) as follows may be applied, for example.

(Method A) The node 100 grasps the key usage history of each application 200, and preferentially assigns the application key to the application 200 with a high key usage history. (Method B) Application key assignment by the node 100 to the application 200 is performed based on the requested amount of key rate or the like (request information) indicated by the application 200 at the time of communication start request. The application key assignment ratio is changed based on the key usage histories of the applications 200. By using this method, immediately after the start of communication of the application 200, (since there is no history information,) key assignment based on the request information informed by the application 200 is performed, and when the encrypted data communication is actually started and the key usage history is obtained, adjustment may be performed by using the key usage history such that the key assignment is performed with the ratio reflecting the reality.

(Method C) Application key assignment by the node 100 to the application 200 is performed based on the requested amount of key rate or the like (request information) indicated by the application 200 at the time of communication start request. However, the assigned volume is reduced for the application 200 for which there is a great discrepancy (difference) between the volume of the application key provided to the application 200 (key provision history) and the key usage history (for example, the key assignment rate is reduced).

Each method described above is an example of the key assignment method. Other methods that use the "key usage history" may also be applied. For example, a configuration is possible according to which the assigned volume of application key is adjusted taking into account the weight or the like of each application determined in advance.

Figure 3:
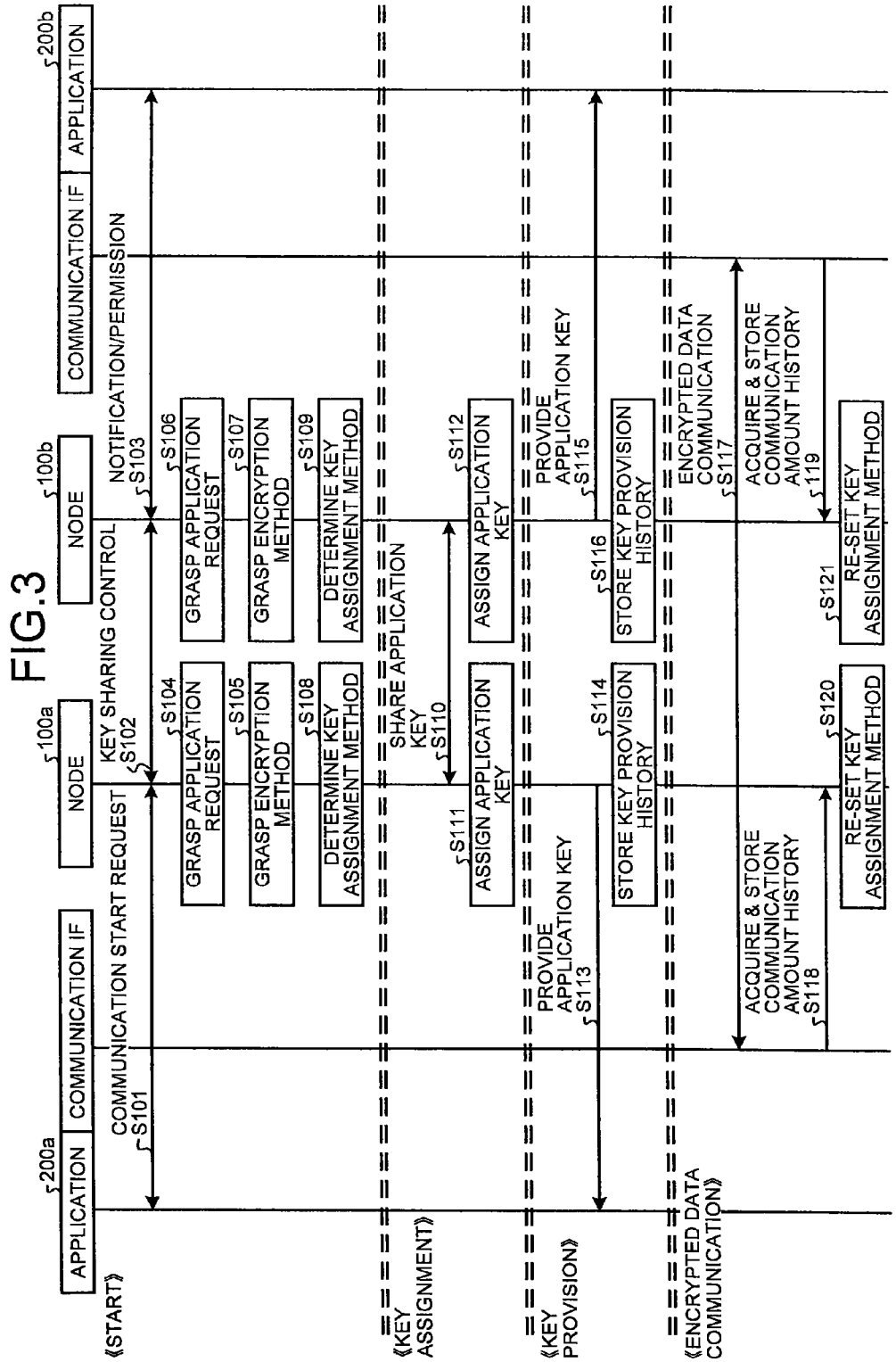
FIG. 3 is a sequence diagram of a key assignment process according to the embodiment.

Next, the key assignment process by the node 100, according to the present embodiment, configured in the above manner will be described with reference to FIG. 3. FIG. 3 is a sequence diagram illustrating an example of the key assignment process according to the present embodiment. FIG. 3 illustrates a node 100a and a node 100b that exchange an application key, an application 200a connected to the node 100a, a communication IF of the application 200a, an application 200b connected to the node 100b, and a communication IF of the application 200b.

The application 200a transmits, to the connected node 100a, a communication start request including pieces of information such as the address of the application 200b which is the communication counterpart in the encrypted data communication to be started, the port number to be used, the encryption method to be used, the rate (requested volume) of application key to be used, and the like (step S101).

The node 100a receives the communication start request from the application 200a, identifies the node 100b with which the application key is to be exchanged, and starts sharing of the application key (step S102). The node 100b may notify the application 200b of the pieces of information such as the address of the application 200b, the port number to be used, the encryption method to be used, the rate (requested volume) of application key to be used, and the like (step S103), and start sharing of the application key after checking the permission or approval for the pieces of information.

At this point, the nodes 100a and 100b are enabled to grasp the information about the rate of the application key requested by the application 200a (and the application 200b) and about the encryption method (steps S104 to S107).

The nodes 100a and 100b refer to the rate of the application key requested and the encryption method, and determine the key assignment method for the applications 200a and 200b (step S108, step S109). For example, in the case where other applications 200 are already connected to the nodes 100a and 100b, the nodes 100a and 100b may determine, at this point, to use the application key assignment method based on the rate of application key requested, with respect to the application 200a (and the application 200b).

When an application key is shared between the node 100a and the node 100b (step S110), each node 100 assigns the application key to the application 200 based on the assignment method determined (step S111, step S112).

In the case where the application key is actually provided to the applications 200 by the nodes 100 (step S113, step S115), the information about the volume of application key provided may be associated with each application 200 and be held by each node 100 (step S114, step S116).

The applications 200a and 200b which have acquired the application key perform encrypted data communication (step S117). When encrypted data is transmitted/received via the communication IFs, the "history information" is updated as the statistical information of the communication IFs. The directly connected nodes 100 are periodically notified of this information by some method (step S118, step S119).

The nodes 100 calculate the volumes of application key used by the pair of applications 200 actually performing encrypted data communication, that is, the "key usage histories", from the "history information" which has been informed by the applications 200 (or acquired from the applications 200) and the information about the encryption method stored in association.

The nodes 100 may change the application key assignment method or assignment ratio by a method described above as a variation of the key assignment method, based on the "key usage histories" (step S120, step S121). Thereafter, when the application key is shared between the node 100a and the node 100b, the application key is assigned to the applications 200 based on the assignment method newly determined.

For example, steps S101 to S109 are operations at the time of communication start (start), steps S110 to S112 are operations at the time of sharing of the application key (key assignment), steps S113 to S116 are operations at the time of providing the application key (key provision), and steps S117 to S121 are operations at the time of the nodes receiving the "history information" from the applications 200 (encrypted data communication). Accordingly, the operations at the time of key assignment, key provision and encrypted data communication may be repeatedly performed in an unspecified order.

As described above, according to the present embodiment, the volume of the application key to be assigned is determined based on the actual usage history of the application key. The application key may thereby be assigned efficiently, reflecting the actual key usage history.

Figure 4:
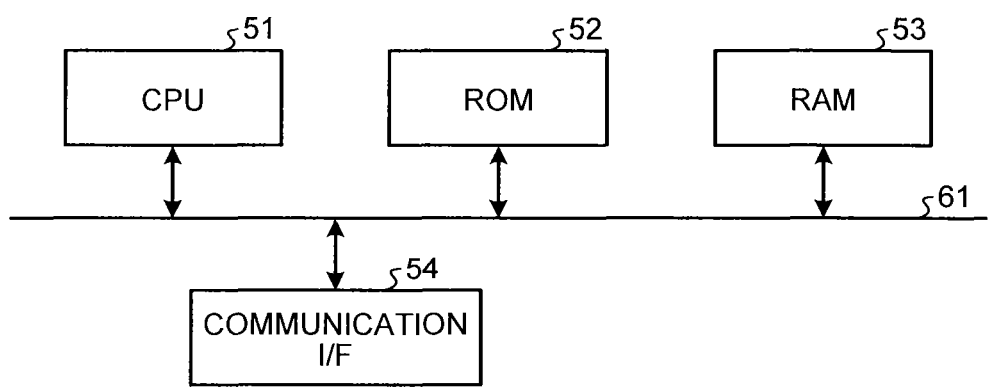
FIG. 4 is a hardware configuration diagram of a communication device according to the embodiment.

Next, a hardware configuration of the communication device according to the present embodiment will be described with reference to FIG. 4. FIG. 4 is an explanatory diagram illustrating a hardware configuration of the communication device according to the present embodiment.

The communication device according to the present embodiment includes a control device such as a CPU (Central Processing Unit) 51, a storage device such as a ROM (Read Only Memory) 52 or a RAM (Random Access Memory) 53, a communication I/F 54 for connecting to a network and performing communication, and a bus 61 for connecting the units.

Programs to be executed by the communication device according to the present embodiment are provided being embedded in the ROM 52 or the like in advance.

The programs to be executed by the communication device according to the present embodiment may alternatively be provided as a computer program product by being recorded in a computer-readable storage medium such as a CD-ROM (Compact Disk Read Only Memory), a flexible disk (FD), a CD-R (Compact Disk Recordable), a DVD (Digital Versatile Disk) or the like in the form of installable or executable files.

Furthermore, the programs to be executed by the communication device according to the present embodiment may be provided by storing the same on a computer connected to a network such as the Internet and downloading the same via the network. Also, the programs to be executed by the communication device according to the present embodiment may be provided or distributed via a network such as the Internet.

The programs to be executed by the communication device according to the present embodiment may cause a computer to function as each of the units (the platform, the link key sharer, the application key sharer, the provider, the acquirer, the controller, the determiner) of the communication device described above. The computer may execute the programs by reading the programs by the CPU 51 from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device, comprising:
processing circuitry configured to operate as
a key sharer configured to receive a communication request from a first application, identify an external device associated with the first application, and exchange and share an encryption key obtained from a memory with the external device;
a key provider configured to provide one or more applications, including the first application, with respective volumes of one or more shared encryption keys to be assigned to corresponding applications of the one or more applications, and respective shared encryption keys of the one or more shared encryption keys being updated by corresponding applications of the one or more applications;
an acquirer configured to receive information relating to a key usage history for each of the one or more applications, the key usage history for an application of the one or more applications indicating a number of encryption key updates performed by the application and a length of the encryption key; and
a determiner configured to determine the respective volumes of the one or more shared encryption keys to be assigned to the one or more applications using the key usage history, wherein
the key provider provides to the one or more applications the volumes of the one or more shared encryption keys determined using the key usage history.

2. The device according to claim 1, wherein the determiner is configured to determine the volumes of the one or more shared encryption keys to be assigned to the one or more applications in such a manner that, for each application of the one or more applications, a rate of the volume of the shared encryption key to be assigned to the each application is proportional to a rate of the key usage history of the each application.

3. The device according to claim 1, wherein the determiner is configured to determine the volume of the shared encryption key to be assigned the first application is greater than a volume of the shared encryption key to be assigned to a second application of the one or more applications, when a value of the key usage history of the first application is greater than a value of the key usage history of the second application.

4. The device according to claim 1, wherein
the determiner is configured to
further acquire a requested volume indicating a volume of the encryption keys requested by each application,
determine the volumes of the shared encryption key to be assigned to the one or more applications using the requested volume when the key usage history is not acquired, and
determine the volumes of the shared encryption key to be assigned to the one or more applications using the key usage history when the key usage history is acquired.

5. The device according to claim 4, wherein the determiner is configured to determine the volumes of the shared encryption key to be assigned to the one or more applications in such a manner that, for each application of the one or more applications, a rate of the volume to be assigned to the each application is proportional to a rate of the requested volume of the each application.

6. The device according to claim 4, wherein the determiner is configured to determine the volumes of the shared encryption key to be assigned to the one or more applications, according to a difference between the key usage history and the volumes assigned according to the requested volume.

7. A communication method, comprising:
receiving a communication request from a first application;
identifying an external device associated with the first application;
exchanging and sharing an encryption key with the external device;
providing one or more applications, including the first application, with respective volumes of one or more shared encryption keys to be assigned to corresponding applications of the one or more applications, and respective shared encryption keys of the one or more shared encryption keys being updated by corresponding applications of the one or more applications;
receiving information relating to a key usage history for each of the one or more applications, the key usage history for an application of the one or more applications indicating the number of encryption key updates performed by the application and the length of the encryption key; and
determining the respective volumes of the shared encryption keys to be assigned to the one or more applications using the key usage history, wherein
the volumes of the one or more shared encryption keys determined using the key usage history are the volumes of the one or more shared encryption keys provided to the one or more applications in the step of providing the one or more applications, including the first application, with the respective volumes of the one or more shared encryption keys.

8. A computer program product comprising a non-transient computer-readable medium containing a program executed by a computer, the program causing the computer to execute:
identifying an external device associated with a first application from a communication request from the first application;
exchanging and sharing an encryption key with the external device;
providing one or more applications, including the first application, with respective volumes of one or more shared encryption keys to be assigned to corresponding applications of the one or more applications, and respective shared encryption keys of the one or more shared encryption keys being updated by corresponding applications of the one or more applications;
receiving information relating to a key usage history for each of the one or more applications, the key usage history for an application of the one or more applications indicating the number of encryption key updates performed by the application and the length of the encryption key; and
determining the respective volumes of the shared encryption keys to be assigned to the one or more applications using the key usage history, wherein
the volumes of the one or more shared encryption keys determined using the key usage history are the volumes of the one or more shared encryption keys provided to the one or more applications in the step of providing the one or more applications, including the first application, with the respective volumes of the one or more shared encryption keys.

9. A communication system, comprising:
one or more applications configured to use an encryption key; and
a communication device configured to provide the encryption key to the application, wherein
the communication device includes
processing circuitry configured to operate as
a key sharer configured to receive a communication request from a first application, identify an external device associated with the first application, and exchange and share an encryption key obtained from a memory with the external device;
a key provider configured to provide one or more applications, including the first application, with respective volumes of one or more shared encryption keys to be assigned to corresponding applications of the one or more applications, and respective shared encryption keys of the one or more shared encryption keys being updated by corresponding applications of the one or more applications;
an acquirer configured to receive information relating to a key usage history for each of the one or more applications, the key usage history for an application of the one or more applications indicating a number of encryption key updates performed by the application and a length of the encryption key; and
a determiner configured to determine the respective volumes of the shared encryption key to be assigned to the one or more applications using the key usage history, wherein
the key provider provides to the one or more applications the volumes of the one or more shared encryption keys determined using the key usage history.

* * * * *